(12) United States Patent
Wang

(10) Patent No.: US 12,162,598 B2
(45) Date of Patent: Dec. 10, 2024

(54) MULTIROTOR AERIAL VEHICLE WITH TILTABLE ROTOR

(71) Applicant: Xi Wang, Saint-Laurent (CA)

(72) Inventor: Xi Wang, Saint-Laurent (CA)

( * ) Notice: Subject to any disclaimer, the term of this patent is extended or adjusted under 35 U.S.C. 154(b) by 0 days.

(21) Appl. No.: 18/102,714

(22) Filed: Jan. 28, 2023

(65) Prior Publication Data

US 2024/0253778 A1     Aug. 1, 2024

(51) Int. Cl.
*B64C 29/00* (2006.01)
*B64C 15/14* (2006.01)
*B64C 39/06* (2006.01)

(52) U.S. Cl.
CPC .......... *B64C 29/0033* (2013.01); *B64C 15/14* (2013.01); *B64C 29/0025* (2013.01); *B64C 39/068* (2013.01)

(58) Field of Classification Search
CPC . B64C 29/00; B64C 29/0033; B64C 29/0066; B64C 27/20; B64C 27/22; B64C 27/28; B64C 27/82; B64C 2027/8245; B64C 2027/8263; B64C 39/062; B64C 39/068; B64U 10/20; B64U 30/26; B64U 30/294; B64U 30/297
See application file for complete search history.

(56) References Cited

U.S. PATENT DOCUMENTS

| | | |
|---|---|---|
| 3,053,480 A | 9/1962 | Vanderlip |
| 10,364,036 B2 | 7/2019 | Tigh |
| 10,981,650 B2 | 4/2021 | Fink |
| 10,994,829 B2 | 5/2021 | Duffy |
| 11,130,566 B2 | 9/2021 | Mikic et al. |
| 11,912,405 B2 * | 2/2024 | Oliveira ................ B64C 39/068 |
| 2017/0003690 A1 * | 1/2017 | Tanahashi ........... B64C 29/0033 |
| 2020/0156780 A1 * | 5/2020 | Varigas ................ B64C 39/068 |
| 2020/0317353 A1 | 10/2020 | Bevirt |
| 2022/0161927 A1 * | 5/2022 | Moore ..................... B64C 9/24 |
| 2022/0258859 A1 | 8/2022 | Bianco Mengotti |
| 2022/0402603 A1 | 12/2022 | Frank |

* cited by examiner

*Primary Examiner* — Michael C Zarroli
*Assistant Examiner* — Ka Chun Leung

(57) ABSTRACT

A VTOL (vertical take-off and landing) rotorcraft with distributed propulsion system having the capability to convert between VTOL (vertical take-off and landing) flight and airplane flight. The rotorcraft includes a fuselage, a tail boom or tail fin, a pair of wings, a pair of transversally extended forward pivotable rotor booms, a plurality of forward proprotors mounted to the pivotable rotor booms, a plurality of rear lift rotors mounted to the tail boom, and a stabilizer mounted on the tail boom or tail fin. The proprotor and lift rotor can be open rotor or ducted rotor. The proprotors in a first configuration and lift rotors provide the thrust vector for VTOL (vertical take-off and landing) flight. Moreover, the proprotors in a second configuration provide the forward propulsive thrust in airplane flight.

16 Claims, 7 Drawing Sheets

MULTIROTOR AERIAL VEHICLE WITH TILTABLE ROTOR

FIELD OF THE INVENTION

The disclosed invention relates to an aerial vehicle with both VTOL (vertical take-off and landing) and fixed wing flight capability. More specifically, the invention discloses the configuration of the box aerostructure with multiple proprotors and lift rotors.

DISCUSSION OF THE STATE OF THE ART

The helicopter is an essential modern air transportation vehicle. Technically, helicopter with rotary wing is also referred as "rotorcraft" or "rotary wing vehicle". The rotary wing is comprising of a plurality of airfoil blades in rotation to generate thrust by moving air. The rotary wing is commonly referred as "rotor". A rotor positioned in the center of a shroud is called "ducted fan" or "ducted rotor". In general, the plurality of blades rotating on the same axis. The rotor generates thrust to allow the helicopter to land and take-off vertically without the presence of a long runway. Disadvantageously, helicopter with fossil fuel engine is associated with expensive operational cost, undesirable high level of noise and carbon emission.

As the traffic is increasing heavier in the global urban area, an affordable electrical VTOL vehicle is a solution to avoid congestion on the road. Without traffic delay, an electrical VTOL vehicle can also operate as law enforcement vehicle, ambulance and medical cargo transporter. A new term UAM (urban air mobility) is adopted for this new type of aerial transportation.

The arrival of distributed electrical propulsion system and advanced energy storage allows modern VTOL multirotor vehicle to substitute the traditional helicopter. The VTOL multirotor vehicle is advantageous for its safety redundancy, in comparison to a single large rotor helicopter. The electrical propulsion system contains multiple independent smaller rotors to provide lift, propulsion and steering control. Quad-rotorcraft is a popular design for electrical multirotor vehicle, a simple design comprises of four rotors equally spaced apart. The fixed pitch smaller rotor has low inertia, which allows the speed of the rotating blade to be decreased or increased rapidly. The modulation of the power setting on the rotors creates a thrust vector for lift, propulsion and steering control. The disadvantage of the four rotors propulsion is that the rotor is smaller in diameter. Based on the momentum theory, small diameter rotor has low thrust lift efficient, due to the high disc loading.

Advantageously, modern electrical VTOL multirotor vehicle also has the capability to transition to airplane mode for forward flight. The energy required for VTOL flight is significantly higher than the energy required for a fixed wing airplane flight to maintain forward flight. The VTOL multirotor vehicle can experience the following three types of flight mode: thrust borne, partial wing borne, and wing borne. The vehicle is thrust borne in VTOL flight, which means the flight is made possible by rotor thrust countering gravity. The vehicle is partial wing borne, which means the flight is made possible by the combination of rotor thrust and wing lift countering gravity. The vehicle is wing borne in airplane flight, which means above a certain forward speed, the flight is made possible by lift generated by the wing. Furthermore, the forward propulsive movement in the airplane mode is generated by at least one tiltable proprotor. The main challenge of the transitional capability is the rapid handover from thrust borne flight to wing borne flight. The common design with proprotors mounted on the fixed wing lacks of partial wing borne flight capability. The desirable solution is to design the vehicle with partial wing borne flight capability between the transition of thrust borne flight to wing borne flight. Moreover, some modern VTOL design is highly complex with multiple independent actuations to transition between VTOL flight and airplane flight, which leads to the shortfall of unsymmetrical wing lift. Therefore, the desirable solution is to design a VTOL vehicle with a single actuation to transition between VTOL flight and airplane flight.

Traditional fixed wing aircraft suffers from significant losses of lift efficiency at the tip of the wings, due to the occurrence of vortex. As a result, winglet, sharklet and box aerostructure design is introduced to improve lift efficiency.

BRIEF SUMMARY OF THE INVENTION

In one embodiment of the invention of a multirotor vehicle with both VTOL and airplane flight capability is provided, comprising a fuselage having a longitudinal axis, a tail boom, a pair of fixed wings, a pair of rotor booms in the VTOL flight configuration, a pylon coupled to the fixed wings and rotor booms, a plurality of proprotors coupled to the rotor booms, a plurality of lift rotors coupled to the tail boom, a pair of vertical and horizontal stabilizer, a pair of ailerons, a pair of rudders, a pair of elevators, and a pair of jet nozzles. Also, in one embodiment the pair of rotor booms in the airplane flight configuration.

In another embodiment of the invention of a multirotor vehicle with both VTOL and airplane flight capability is provided, comprising a fuselage having a longitudinal axis, a tail fin, a pair of fixed wings, a pair of rotor booms in the VTOL flight configuration, a pylon coupled to the fixed wings and rotor booms, a plurality of ducted proprotors coupled to the rotor booms, a plurality of ducted lift rotors coupled to the tail fin, a pair of vertical and horizontal stabilizer, a pair of ailerons, a pair of rudders, a pair of elevators, and a pair of jet nozzles. Also, in one embodiment the pair of rotor booms in the airplane flight configuration.

BRIEF DESCRIPTION OF THE DRAWINGS

Regarding the invention disclosure, the feature and advantage of the invention are particularly pointed out and distinctly claimed in the claims. Detailed description and methods are given to provide further comprehension of the functionality of the invention. It should be observed that three mutual orthogonal directions X, Y, and Z are shown in some of the FIGURES. The first direction X is said to be "longitudinal", and the forward side is referenced to be positive. Rotational movement around the longitudinal axis is said to be "roll". The second direction Y is said to be "transverse", and the port side is referenced to be positive. And the median Y plane is referenced as centerline of the vehicle. Rotational movement around the transverse axis is said to be "pitch". Finally, the third direction Z is said to be "vertical", and the upside is referenced to be positive. Rotational movement around the vertical axis is said to be "yaw". Furthermore, the direction of motion or rotation is shown in hollow arrow and force vector is shown in solid arrow.

DETAILED DESCRIPTION OF THE EMBODIMENTS

Advantageously, VTOL (vertical take-off and landing) vehicle can operate without a long runway. However, VTOL flight requires significantly higher energy than the energy required for a fixed wing aircraft to maintain forward flight. Therefore, the usefulness of VTOL vehicle is limited to short range flight. Modern VTOL vehicle is commonly designed with electrical power plant. In order to reduce the weight of electrical energy storage, an efficient VTOL vehicle can convert to airplane configuration for long range forward fight. In the disclosure of the invention, the technical term rotary wing is referred as "rotor", and a rotary wing dedicated to generate lift is referred as "lift rotor". Moreover, the technical term "proprotor" is referred as the rotary wing capable of operating both as an airplane-style propeller and helicopter-style rotor. Moreover, the term "symmetric" is used to describe a component, feature, or element which is symmetrical with respecting to the median Y plane of the rotorcraft. It is further understood that the terms "includes", "including", "comprises", "comprising", "couples", "coupled", "mounts", and "mounted", when used herein, specify the presence of stated features, components and elements, without the further detail on the method of mechanical interconnexion. In addition, it is also understood that the singularity form "a", "an", and "the" used throughout the description are intended to include plural forms as well, unless the context clearly specifies otherwise.

Figure 1:
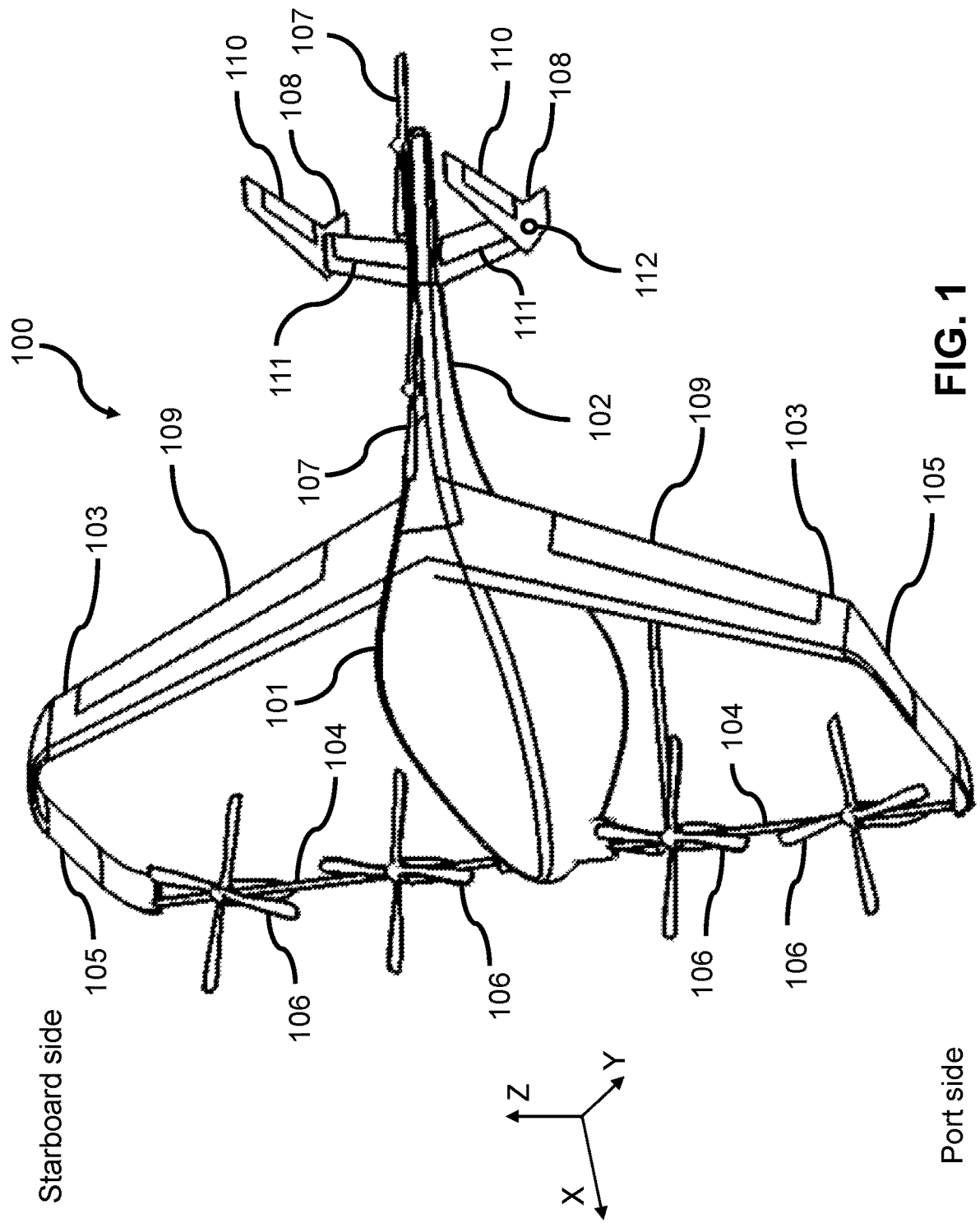
FIG. 1 is a perspective view of the multirotor vehicle in accordance with an embodiment of the present invention during VTOL flight.
Figure 2:
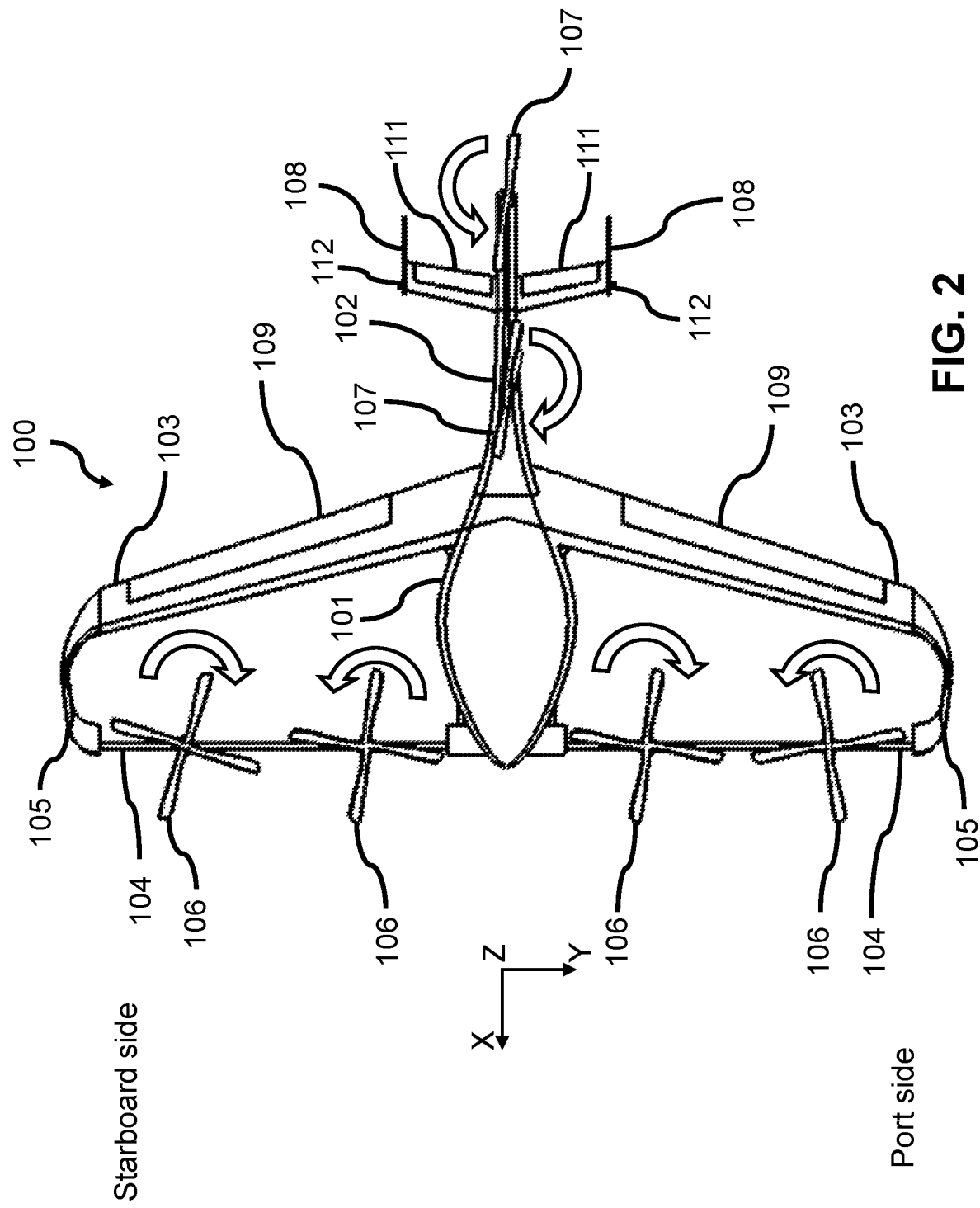
FIG. 2 is a top plane view from the embodiment of FIG. 1.

As shown in FIGS. 1 to 2, multirotor aerial vehicle from embodiment 100 in VTOL flight configuration. FIG. 1 shows a perspective view of embodiment 100. The multirotor vehicle 100 comprises of the fuselage 101, the tail boom 102, the wings 103, the tiltable rotor booms 104, the pylons 105, a plurality of forward proprotors 106, a plurality of tail lift rotors 107, the vertical and horizontal stabilizer 108, the ailerons 109, the rudders 110, the elevators 111, and the jet nozzles 112. The longitudinally extended fuselage 101 is coupled together with the longitudinally extended tail boom 102. The proximal ends of the transversely extended symmetric wings 103 are coupled to the upper portion of the fuselage 101. Naturally, the center of the wing's lift force is positioned near the center of gravity of the vehicle along the longitudinal direction. The proximal ends of the transversely extended symmetric tiltable rotor booms 104 are coupled to the lower portion of the fuselage 101. The distal ends of the wings 103 and the distal ends of the tiltable rotor booms 104 are coupled together by the pylons 105 to form the box aerostructure. The wings 103 are provided with the ailerons 109. Each tiltable rotor boom 104 is provided with a plurality of forward proprotors 106, positioned side by side along the transverse axis. Embodiment 100 is an example having two proprotors 106 on each of the rotor booms 104, but not limited to two proprotors 106. The tiltable rotor booms 104 are shown in the VTOL flight configuration. The tiltable rotor booms 104 is associated to an actuator to tilt up and down to change the proprotors 106 thrust vector relative to the fuselage 101. The tail boom 102 is provided with a plurality of lift rotors 107, positioned tandemly along the longitudinal axis. Embodiment 100 is an example having two lift rotors 107 on the tail boom 102, but not limited to two lift rotors 107. A practical application can have a combination of a total of four, six, eight or ten proprotors 106 and two, four or six lift rotors 107. The proprotor 106 might have fixed pitch or variable pitch blade to achieve optimal operational efficiency for both VTOL flight and airplane flight. The vertical and horizontal stabilizer 108 is coupled to the tail boom 102. The vertical and horizontal stabilizer 108 is provided with the rudders 110, and elevators 111. The vertical and horizontal stabilizer 108 might have hinged trim tabs to tune the heading, levelling, speed and attitude of the vehicle. Moreover, the vertical and horizontal stabilizer 108 is provided with the jet nozzles 112.

FIG. 2 shows a top plane view of the multirotor aerial vehicle from embodiment 100 in VTOL flight configuration. One possible combination of the rotational direction of the proprotors 106 and lift rotors 107 are shown in hollow arrows.

Figure 3:
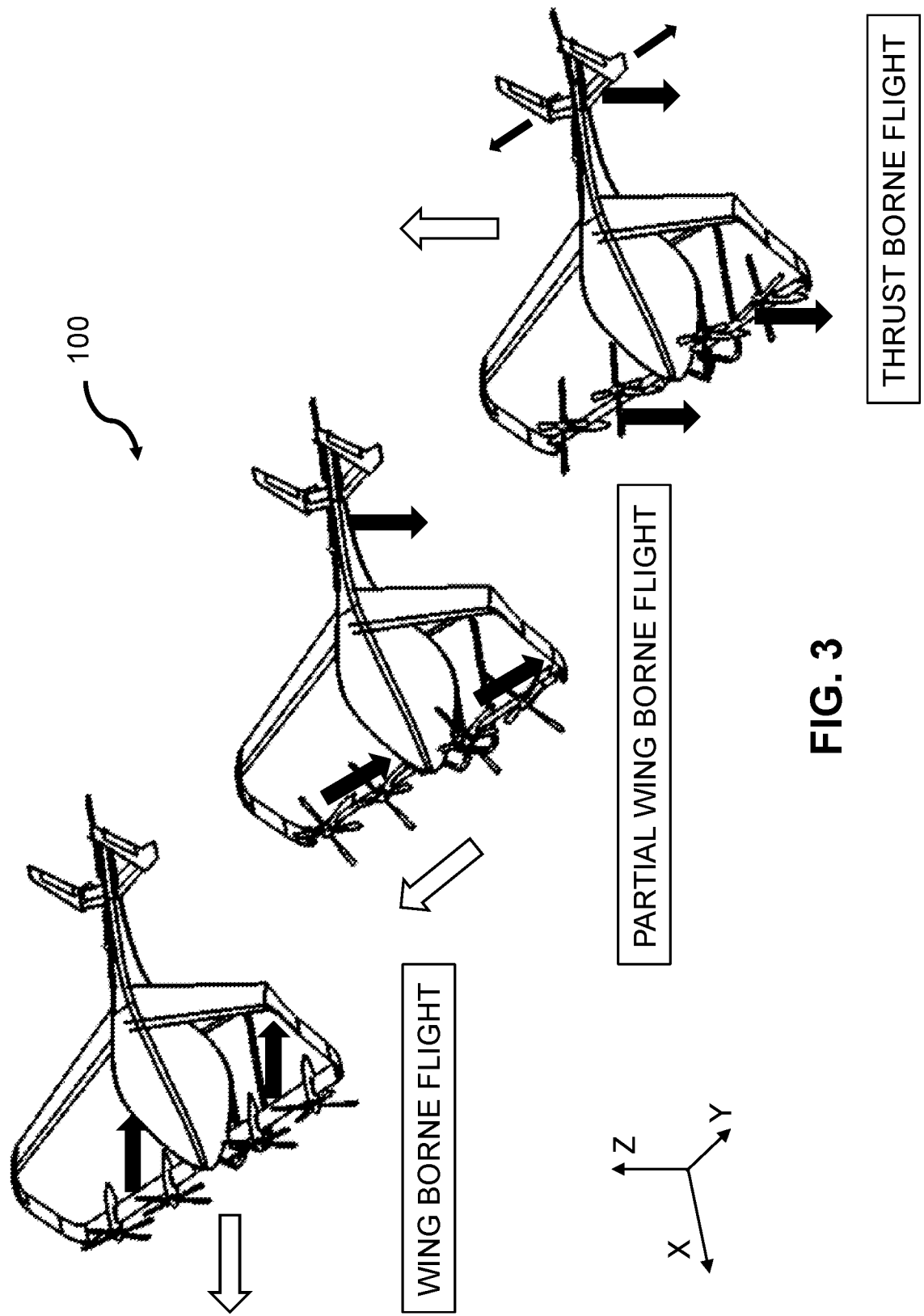
FIG. 3 is a perspective view of the multirotor vehicle in accordance with an embodiment transitioning between different flight configurations.

FIG. 3 shows perspective view of the multirotor aerial vehicle from embodiment 100 transitioning to different flight configurations.

Figure 4:
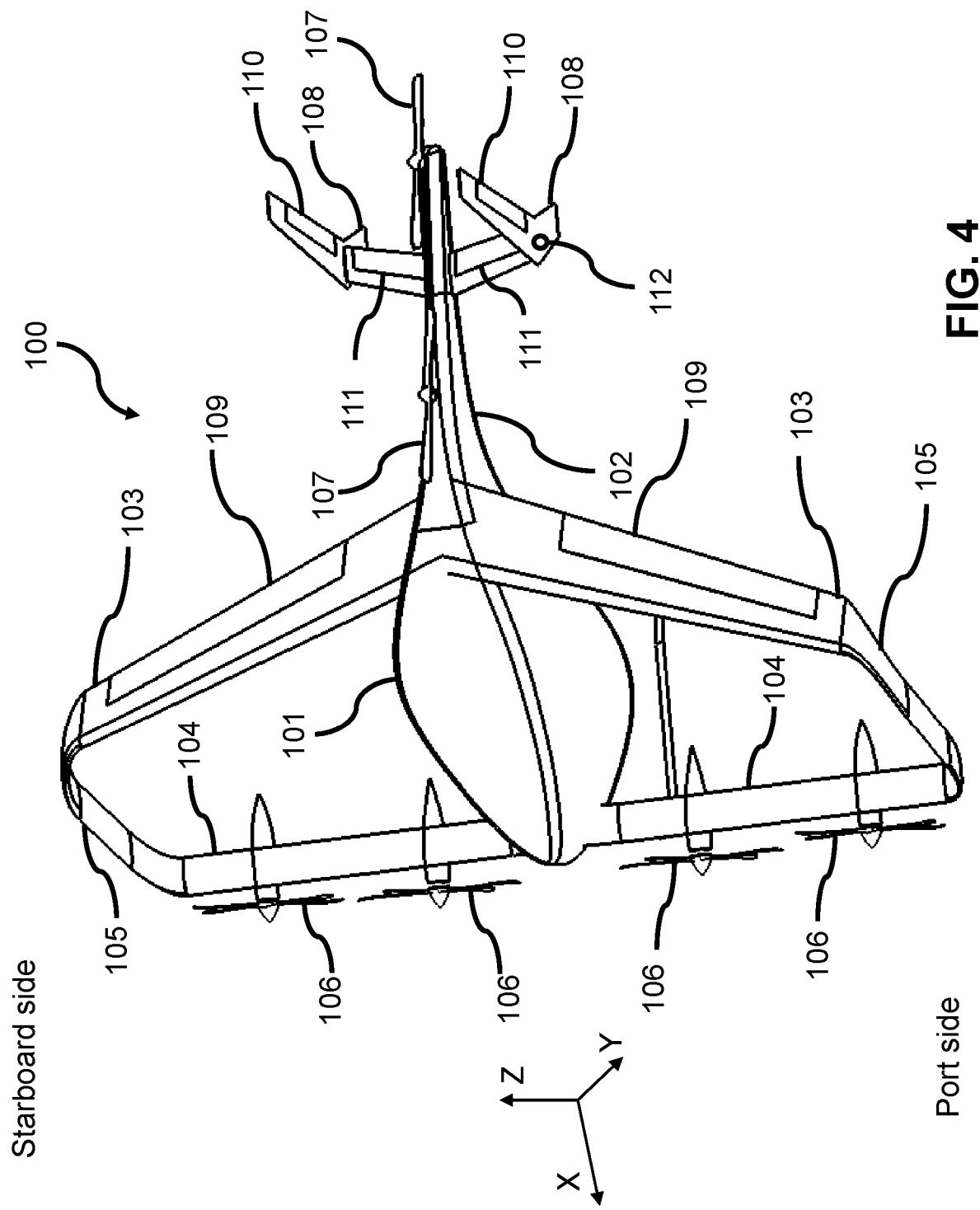
FIG. 4 is a perspective view of the multirotor vehicle in accordance with an embodiment of the present invention during airplane flight.

FIG. 4 shows a perspective view of the multirotor aerial vehicle from embodiment 100 in airplane flight configuration.

Figure 5:
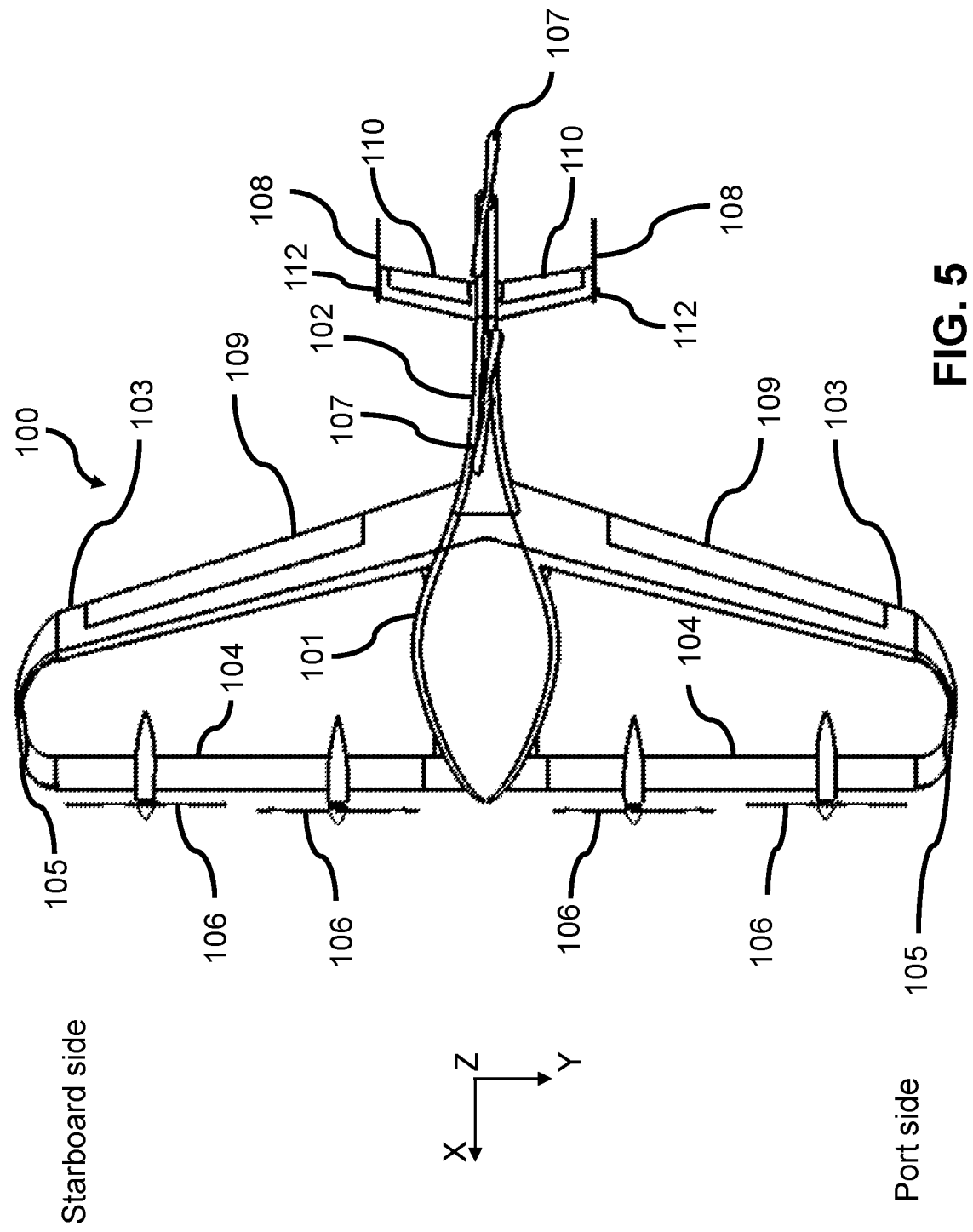
FIG. 5 is a top plane view from the embodiment of FIG. 4.

FIG. 5 shows a top plane view of the multirotor aerial vehicle from embodiment 100 in airplane flight configuration.

The multirotor aerial vehicle from embodiment 100 in different flight configurations is shown in FIG. 3. The operation in different flight configurations is described in the following section. The multirotor vehicle 100 has four proprotors 106 and two lift rotors 107 to operate in VTOL flight (thrust borne flight). The tiltable rotor booms 104 pitch the proprotors 106 up to direct the thrust vector vertically. An example of the direction of the rotation of the proprotors is shown by the hollow arrow in FIG. 2. As a result of the counter-rotation nature, the torque effect is net zero for each pair of lift rotors 107, each pair of starboard side proprotors 106 and port side proprotors 106 operating at the same power setting. Naturally, the four proprotors 106 and two lift rotors 107 provide the thrust vector during VTOL flight for taking-off, landing, hovering, and flying vertically. The effective maneuvering thrust vectors are shown in solid arrow and the direction of travel is shown in hollow arrow in FIG. 3. Moreover, the modulation of the power setting of the proprotors 106 and lift rotors 107 creates a desirable torque effect to assist the vehicle to change yaw heading. The axis of the rotation of the proprotors 106 and lift rotors 107 may be canted from the vertical axis to minimize the damage resulting from a blade failure event (commonly referred as rotor burst). In detail, the canted orientating allows rotor burst trajectory to avoid impacting the fuselage 101, adjacent propulsion component and flight critical component. In the event of a failure of one of the proprotors 106 or lift rotors 107, the unbalanced yawing motion can be counted by the jet nozzles 112. The jet nozzles 112 associated by a motor fan provides a thrust vector in the longitudinal direction against the rotor boom 102 to create a corrective yawing torque moment acting on the multirotor vehicle 100. The lateral thrust vectors along the transverse direction of the jet nozzles 112 are shown in FIG. 3. The propulsive thrust of the jet nozzles 112 is not affected by the propwash of the lift rotors 107. In order to transition from VTOL flight (thrust borne flight) to airplane flight (wing borne flight), the tiltable rotor booms 104 tilt from VTOL flight configuration to airplane flight configuration. Firstly, the tiltable rotor booms 104 pitch the orientation of the proprotors 106 thrust vector between vertical and horizontal direction. Meanwhile, the thrust vector of proprotors 106 has a vertical component to lift the vehicle and a horizontal component to propel the vehicle forward. Consequently, the power setting of the proprotors 106 also increased to produce higher magnitude of thrust. Beneficially, wings 103 are not affected by the downwash flow of proprotors 106. Therefore, undisturbed air flow interacts with the wings 102 to generate airfoil lift force. The vehicle is known to be in partial wing borne flight due to the sum of the airborne lift force is contributed by the wings 103, proprotors 106 and lift rotors 107. As the vehicle gains higher forward speed in levelled flight, the wing lift force increases and overall thrust lift force decreases. This process allows a smooth transition from thrust borne flight to wing borne flight. Finally, upon reaching the desired cruise speed, the flight is fully transitioned to airplane flight when all the airborne lift force is provided by the wings 103. In detail, the tiltable rotor booms 104 tilt the proprotors 106 to the airplane flight configuration to direct the thrust vector horizontally and the proprotors 106 continue to propel the vehicle throughout the forward flight. Moreover, lift rotors 107 become unpowered and the blade of the lift rotors 107 are stowed in parallel with the longitudinal axis to reduce aerodynamic drag. In airplane flight, the actuatable ailerons 109, rudders 110, and elevators 111 provide the flight control capability to steer the vehicle in the pitch, roll and yaw axis. Finally, vertical and horizontal stabilizer 108 provides directional stability during airplane flight and might have hinged trim tabs to tune the heading, levelling, speed and attitude of the vehicle.

Figure 6:
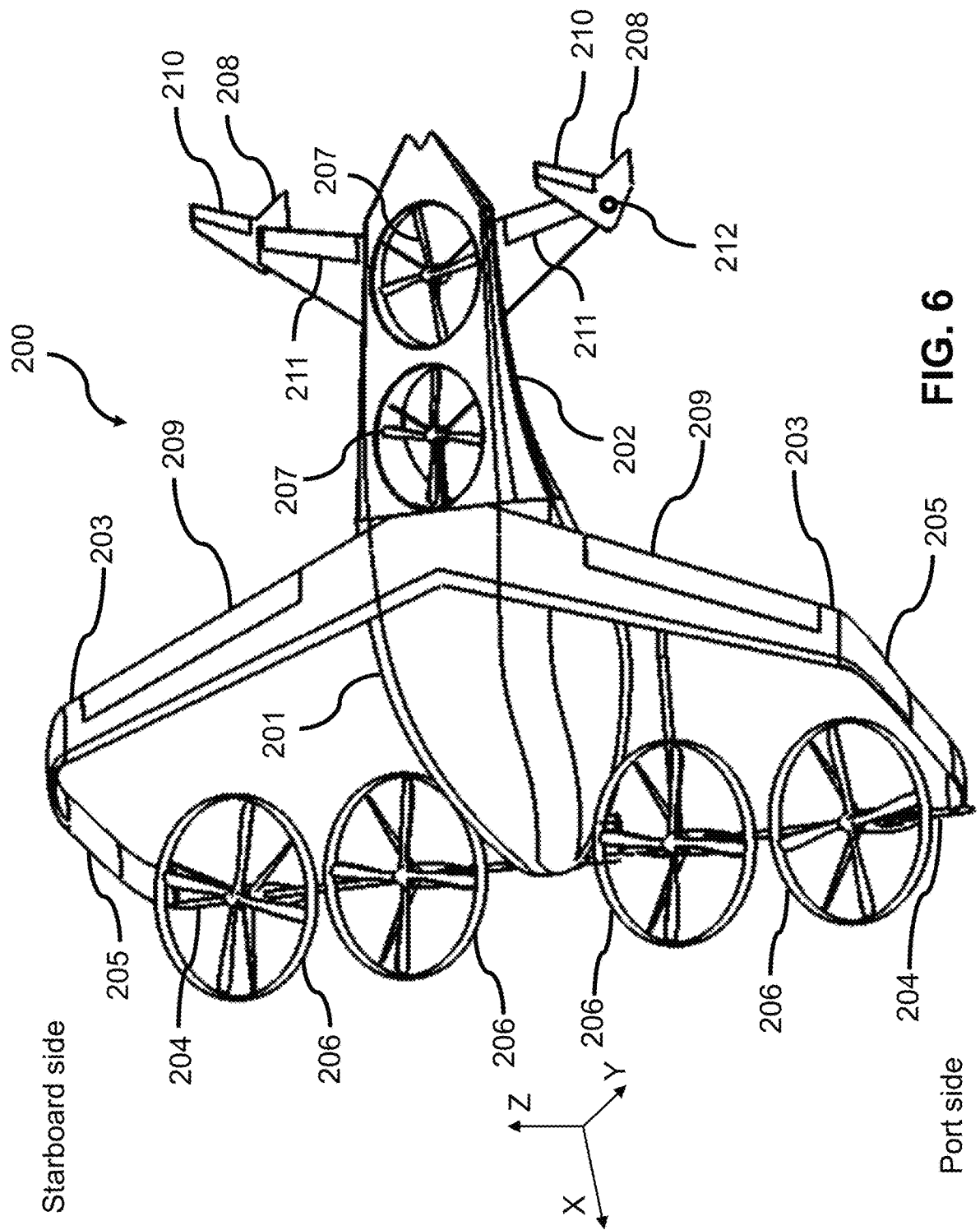
FIG. 6 is a perspective view of the multirotor vehicle in accordance with a second embodiment of the present invention during VTOL flight.
Figure 7:
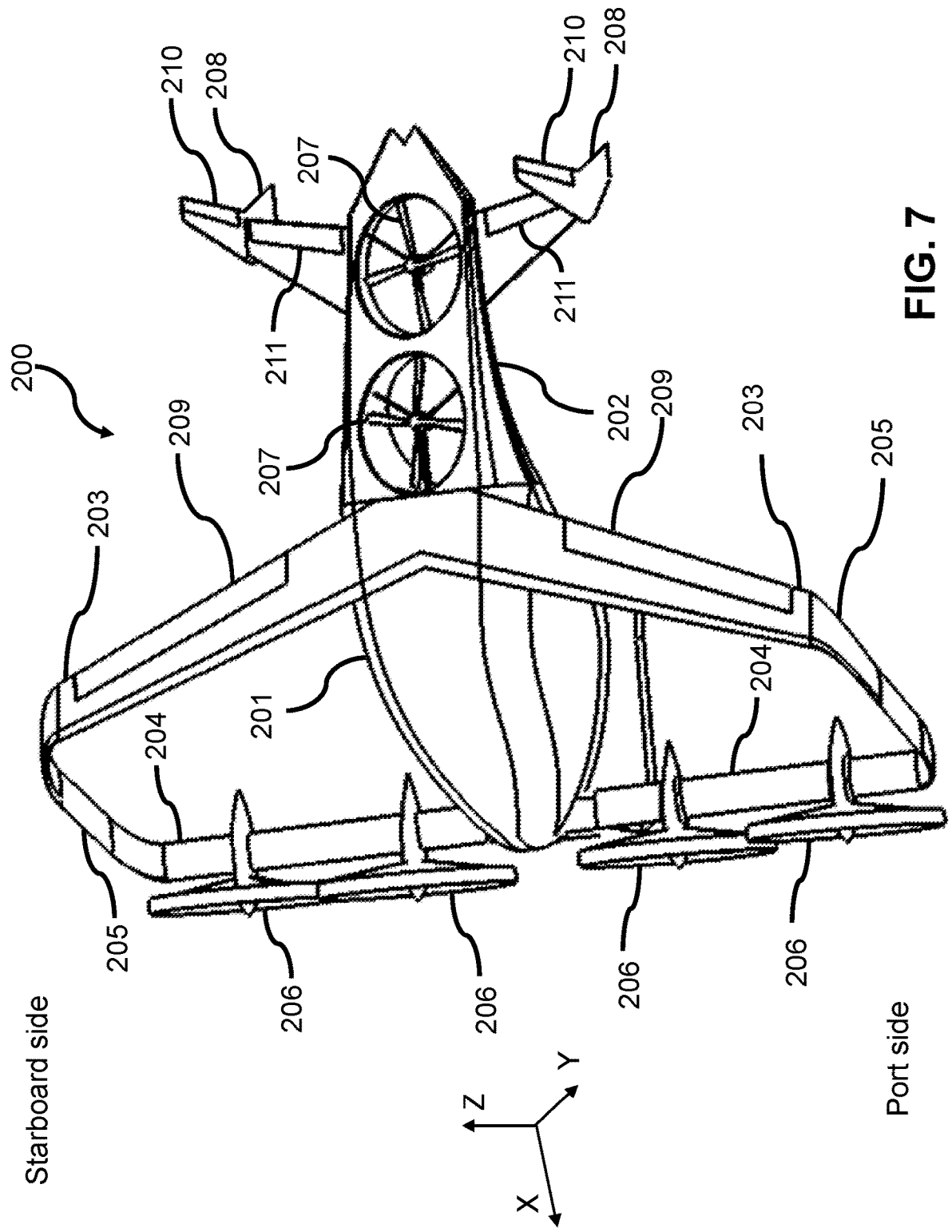
FIG. 7 is a perspective view of the multirotor vehicle in accordance with a second embodiment of the present invention during airplane flight.

As shown in FIGS. 6 to 7, multirotor aerial vehicle from embodiment 200. FIG. 6 shows a perspective view of embodiment 200 in VTOL flight configuration. The multirotor vehicle 200 comprises of the fuselage 201, the blended tail fin 202, the wings 203, the tiltable rotor booms 204, the pylons 205, a plurality of forward ducted proprotors 206, a plurality of tail ducted lift rotors 207, the vertical and horizontal stabilizer 208, the ailerons 209, the rudders 210, the elevators 211, and the jet nozzles 212. The longitudinally extended fuselage 201 is coupled together with the longitudinally extended tail fin 202. The tail fin 202 is blended with the fuselage 201 for aerodynamic benefit. The proximal ends of the transversely extended symmetric wings 203 are coupled to the upper portion of the fuselage 201. Naturally, the center of the wing's lift force is positioned near the center of gravity of the vehicle along the longitudinal direction. The proximal ends of the transversely extended symmetric tiltable rotor booms 204 are coupled to the lower portion of the fuselage 201. The distal ends of wings 203 and the distal ends of the tiltable rotor booms 204 are coupled together by pylons 205 to form the box aerostructure. The wings 203 are provided with the ailerons 209. Each tiltable rotor boom 204 is provided with a plurality of forward ducted proprotors 206, positioned side by side along the transverse axis. Embodiment 200 is an example having two ducted proprotors 206 on each of the rotor booms 204, but not limited to two proprotors 206. The tiltable rotor booms 204 are shown in the VTOL flight configuration. The tiltable rotor booms 204 is associated to an actuator to tilt up and down to change the proprotors 206 thrust vector relative to the fuselage 201. The tail fine 202 is provided with a plurality of ducted lift rotors 207, positioned tandemly along the longitudinal axis. Embodiment 200 is an example having two ducted lift rotors 207 on the tail fin 202, but not limited to two ducted lift rotors 207. A practical application can have a combination of a total of four, six, eight or ten proprotors 206 and two, four or six lift rotor 207. The ducted proprotor 206 might have fixed pitch or variable pitch blade to achieve optimal operational efficiency for both VTOL flight and airplane flight. The duct offers protection and containment for the rotating blade of ducted proprotor 206 and ducted lift rotor 207. The vertical and horizontal stabilizer 208 is coupled to the tail fin 202. The vertical and horizontal stabilizer 208 is provided with the rudders 210, and elevators 211. The vertical and horizontal stabilizer 208 might have hinged trim tabs to tune the heading, levelling, speed and attitude of the vehicle. Moreover, the vertical and horizontal stabilizer 208 is provided with the jet nozzles 212.

FIG. 7 shows a perspective view of the embodiment 200 in airplane flight configuration. The function and operation of the multirotor aerial vehicle in VTOL and airplane flight from embodiment 200 is exactly the same as embodiment 100. Embodiment 200 is an alternative configuration of embodiment 100 with the duct wrapped around the proprotors and lift rotors. The ducted proprotors 206 and ducted lift rotors 207 are advantageous for the higher propulsive efficiency and lower operational noise. Moreover, the ducted proprotors 206 and ducted lift rotors 207 configuration protects the rotating blades from striking a foreign body and contains any departing blade in a rotor burst event.

Naturally, there are numerous variations, modifications and alternative configurations which may be made hereto without departing from the scope of the disclosure invention. It should be understood that the embodiments are for illustrative and explanatory purpose, and it is not conceivable to identify exhaustively all possible embodiments. In particular, it is important to observe that the invention as described relates to a multirotor aerial vehicle with specific positioning of the forward tiltable rotors and rear fixed rotors secured to the vehicle. Contrary to a handful examples of multirotor VTOL vehicle design, this invention has neither tiltable rotors nor lift rotors coupled to the wing. The absence of disruption by nacelle and rotor propwash over the clean wing is beneficial for decreasing noise and improving lift performance. Moreover, the lift characteristic of the clean wing has minimized impact by rotor propwash during transition between thrust borne flight and wing borne flight. The tiltable rotor can be achieved by tiltable boom, tiltable nacelle pod or tiltable rotor hub. Advantageously, the tiltable rotor booms require a single actuator to convert between thrust borne flight and wing borne flight. The distal end of the rotor boom is mechanical coupled to the distal end of the wing to create the box aerostructure is an option. The box aerostructure benefits from an improvement of structural strength, fatigue strength and load carrying strength. Nevertheless, the invention is applicable to any multirotor vehicle of arbitrary weight, such as a light drone to a large tonnage vehicle.

The invention claimed is:

1. A multirotor vehicle adapted for both VTOL (vertical take-off and landing) and horizontal airplane flight comprising:

a longitudinally extended fuselage;

a longitudinally extended tail boom, said tail boom is coupled to a rear end of said fuselage;

a symmetric pair of transversely extended wings, each of said wings having a proximal end coupled to said fuselage;

a symmetric pair of transversely extended tiltable rotor booms, each of said rotor booms associated to an actuator having a proximal end coupled to said fuselage;

a symmetric pair of vertically extended pylons, each of said pylons having an upper end coupled to a distal end from each of said wings, and each of said pylons having a lower end coupled to a distal end from each of said tiltable rotor boom;

a plurality of proprotors, said plurality of is proprotors are coupled to said tiltable rotor booms;

a plurality of lift rotors, said plurality of lift is rotors are coupled to said tail boom;

a symmetric pair of vertical and horizontal stabilizer, each of said vertical and horizontal stabilizer having a horizontal airfoil with a proximal end coupled to said tail boom, and each of said vertical and horizontal stabilizer having a vertical airfoil coupled to a distal end of the vertical horizontal airfoil;

a symmetric pair of ailerons, said ailerons associated to an actuator are coupled to said wings;

a symmetric pair of rudders, said rudders are coupled to the vertical airfoil of said vertical and horizontal stabilizer;

a symmetric pair of elevators, said elevators associated to an actuator are coupled to the horizontal airfoil of said vertical and horizontal stabilizer;

a symmetric pair of jet nozzles, said jet nozzles associated to a motor fan are coupled to said vertical and horizontal stabilizer.

2. The multirotor vehicle as set forth in claim 1, wherein said plurality of proprotors have a plurality of airfoil blades with variable collective pitch capability.

3. The multirotor vehicle as set forth in claim 1, wherein said plurality of proprotors in the VTOL configuration and said plurality of lift rotors have the axis of rotation canted from the vertical axis to direct rotor burst trajectory away from critical flight components and passenger.

4. The multirotor vehicle as set forth in claim 1, wherein said pair of tiltable rotor booms can tilt on the pitch axis to orient the thrust vector of said plurality of proprotors vertically downward in VTOL flight, diagonally downward and aftward in partial wing borne flight, and horizontally aftward in airplane flight.

5. The multirotor vehicle as set forth in claim 1, wherein said plurality of proprotors in the VTOL flight configuration and said plurality of lift rotors provide the vertical thrust vector to hover, fly up, fly down, fly forward, fly backward, fly sideway and change yaw heading.

6. The multirotor vehicle as set forth in claim 1, wherein said plurality of proprotors in airplane flight configuration provide the horizontal thrust for airplane flight and said wings provide the lift force to maintain airborne.

7. The multirotor vehicle as set forth in claim 1, wherein said pair of ailerons, said pair of rudders and said pair of elevators provide the flight control for pitch, roll and yaw during airplane flight.

8. The multirotor vehicle as set forth in claim 1, wherein said jet nozzles provide the lateral thrust to correct yaw motion.

9. A multirotor vehicle adapted for both VTOL (vertical take-off and landing) and horizontal airplane flight comprising:

a longitudinally extended fuselage;

a longitudinally extended tail fin, said tail fin is coupled to a rear end of said fuselage;

a symmetric pair of transversely extended wings, each of said wings having a proximal end coupled to said fuselage;

a symmetric pair of transversely extended tiltable rotor booms, each of said rotor booms associated to an actuator having a proximal end coupled to said fuselage;

a symmetric pair of vertically extended pylons, each of said pylons having an upper end coupled to a distal end from each of said wings, and each of said pylons having a lower end coupled to a distal end from each of said tiltable rotor boom;

a plurality of ducted proprotors, said plurality of ducted proprotors are coupled to said tiltable rotor booms;

a plurality of ducted lift rotors, said plurality of ducted lift rotors are coupled to said tail fin;

a symmetric pair of vertical and horizontal stabilizer, each of said vertical and horizontal stabilizer having a horizontal airfoil with a proximal end coupled to said tail fin, and each of said vertical and horizontal stabilizer having a horizontal vertical airfoil coupled to a distal end of the horizontal airfoil;

a symmetric pair of ailerons, said ailerons associated to an actuator are coupled to said wings;

a symmetric pair of rudders, said rudders are coupled to the vertical airfoil of said vertical and horizontal stabilizer;

a symmetric pair of elevators, said elevators associated to an actuator are coupled to the horizontal airfoil of said vertical and horizontal stabilizer;

a symmetric pair of jet nozzles, said jet nozzles associated to a motor fan are coupled to said vertical and horizontal stabilizer.

10. The multirotor vehicle as set forth in claim 9, wherein said plurality of ducted proprotors have a plurality of airfoil blades with variable collective pitch capability.

11. The multirotor vehicle as set forth in claim 9, wherein said plurality of ducted proprotors in the VTOL configuration and said plurality of ducted lift rotors have the axis of rotation canted from the vertical axis to direct rotor burst trajectory away from critical flight components and passenger.

12. The multirotor vehicle as set forth in claim 9, wherein said pair of tiltable rotor booms can tilt on the pitch axis to orient the thrust vector of said plurality of ducted proprotors vertically downward in VTOL flight, diagonally downward and aftward in partial wing borne flight, and horizontally aftward in airplane flight.

13. The multirotor vehicle as set forth in claim 9, wherein said plurality of ducted proprotors in the VTOL flight configuration and said plurality of ducted lift rotors provide the vertical thrust vector to hover, fly up, fly down, fly forward, fly backward, fly sideway and change yaw heading.

14. The multirotor vehicle as set forth in claim 9, wherein said plurality of ducted proprotors in airplane flight configuration provides the horizontal thrust for airplane flight and said wings provide the lift force to maintain airborne.

15. The multirotor vehicle as set forth in claim 9, wherein said pair of ailerons, said pair of rudders and said pair of elevators provide the flight control for pitch, roll and yaw during airplane flight.

16. The multirotor vehicle as set forth in claim 9, wherein said jet nozzles provide the lateral thrust to correct yaw motion.

\* \* \* \* \*